INVENTOR.
RAYMOND S. POQUETTE, Jr.
BY Herbert L. Davis
ATTORNEY

United States Patent Office 3,241,376
Patented Mar. 22, 1966

---

3,241,376
TEMPERATURE COMPENSATING MEANS FOR LIQUID DAMPED GYROSCOPIC INSTRUMENT
Raymond S. Poquette, Jr., Glen Ridge, N.J., assignor to The Bendix Corporation, Teterboro, N.J., a corporation of Delaware
Filed Sept. 25, 1961, Ser. No. 140,401
3 Claims. (Cl. 74—5.5)

This invention relates to a temperature compensating means for a gyroscopic instrument and more particularly to a gyroscopic instrument having a sealed gyroscopic element mounted within a housing which is immersed in a damping liquid wherein new and novel means in accordance with this invention are provided for maintaining the damping force or damping coefficient of the damping fluid substantially constant over a large temperature range.

This invention contemplates providing a gyroscopic instrument wherein the principal elements of the gyro are mounted within a sealed gimbal and the gimbal is mounted within a cylindrical housing on support elements which are in axial alignment with the longitudinal axis of the housing. Transient shock or vibration forces which may be applied to the gyro housing are transmitted to the gimbal through the support elements. Such forces adversely affect the precession of the gimbal thus introducing error into the gyroscopic instrument output. It has been found that such forces can be dampened and substantially eliminated in the gimbal housing if the gyro housing is filled with a suitable damping liquid to completely immerse the gimbal which houses the main gyro elements provided the temperature of the damping liquid is maintained constant.

The damping force which the damping liquid exerts upon the gimbal is determined by the configuration of all of the exposed gimbal areas with which the damping liquid interacts and the viscosity of the damping liquid. Further, the viscosity of the preferred damping liquid decreases while its volume increases upon an increase in the prevailing effective or ambient temperature. Therefore, the damping force of the damping liquid will not remain constant under all conditions of ambient temperature but will decrease with an increase in ambient temperature and increase with a decrease in ambient temperature. It will be appreciated therefore that the damping force of the damping liquid upon the gimbal may be too small when the temperature of the damping liquid increases above the temperature for which the gyro gimbal may be designed for operation while the damping force of the damping liquid may be too large when the temperature of the damping liquid decreases below the temperature for which the gyro gimbal may be designed for operation. The damping force or coefficient of damping of the damping liquid may be maintained constant under all conditions of ambient temperature by heating the damping liquid. Such heaters are too heavy, occupy much needed space and require an additional power supply with its attendant limitations. For these reasons, heater systems have been found unsuitable for use in small compact gyroscopic instruments.

Therefore, it is contemplated by this invention to provide means for maintaining the damping force of the damping liquid constant under varying conditions of ambient temperature by providing a temperature responsive automatically adjustable means for varying the width of a liquid filled shear space between a shear plate affixed to the gimbal and a second plate caried by the gyro housing.

It will be seen, therefore, that it is an object of this invention to provide a gyroscopic instrument having a gyro element mounted therein which is immersed in a damping liquid wherein means are provided for maintaining the effective damping force of the damping liquid substantially constant over a wide temperature range.

Another object of the invention is to provide novel means for maintaining close tolerances on the coefficient of damping of a liquid-damped hermetically sealed rate gyroscope over a wide temperature range, and more particularly to means for compensating for non-linear changes with temperature in the viscosity of a damping liquid utilized for damping the motion of the gimbal of the gyroscope about an operative axis.

Another object of the invention is to provide in such a sealed rate gyroscope novel means to compensate simultaneously for changes in volume and viscosity of the damping liquid due to changes in temperature and in which the volume compensation is provided by a novel bellows arrangement which will expand as the liquid contracts with decreasing temperature so that a shear gap between gimbal and housing carried shear plates will be constantly filled with the damping liquid while the viscosity compensation is effected by the bellows arrangement varying the width of the shear gap in proportion to the liquid viscosity variation with the changes in temperature so that the ratio of fluid viscosity to the shear gap, which is proportional to the coefficient of damping, remains constant.

A further object of the invention is to provide in such a sealed rate gyroscope novel means utilizing the linear volume-temperature characteristics of the damping liquid to actuate other means to compensate for the non-linear variations in the viscosity of the damping liquid with varying conditions of ambient temperature.

It is a further object of the invention to provide a damping compensator comprising a bellows assembly having a plurality of bellows of varying sizes each being biased to an elongated position by spring means of varying sizes and a shear plate assembly having relatively movable spaced apart shear plates defining therebetween a variable size shear space, one of the relatively movable shear plates being movably connected to the bellows assembly, the damping compensator being adapted to be immersed in a damping liquid, the volume of which varies as a direct function of a variation in ambient temperature and the viscosity of which varies as an inverse function of a variation in the ambient temperature, the bellows assembly being operative in response to a variation in the volume of the damping liquid to vary the size of the shear space as a direct function of a variation in the viscosity of the damping liquid.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for purposes of illustration and description only, and are not to be construed as defining the limits of the invention.

Figure 1:
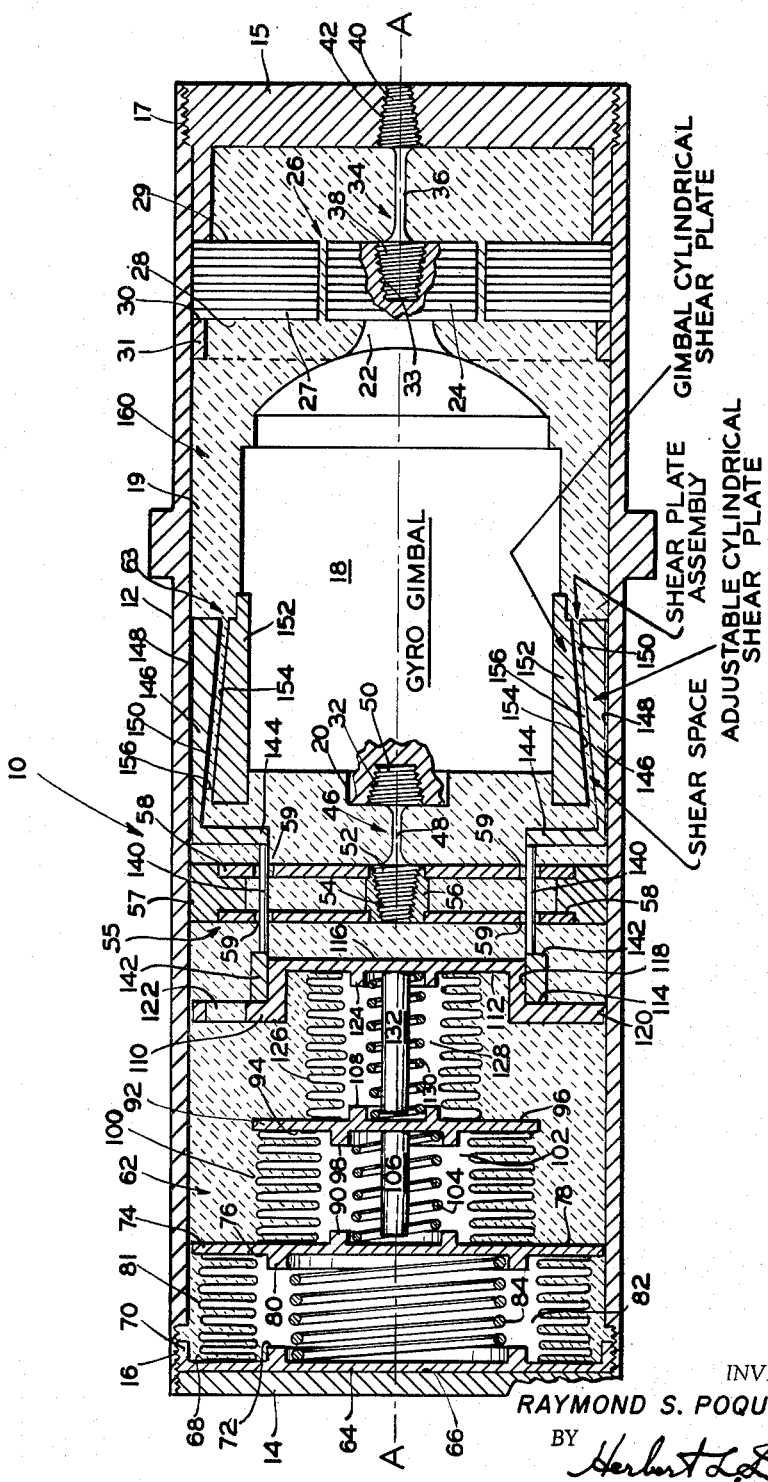
FIGURE 1 is a partial sectional side view of a gyroscopic instrument embodying the improved damping compensator of the invention.

Referring now to the drawings and more particularly to FIGURE 1 wherein there is shown a gyroscopic instrument 10 embodying the improved temperature damping compensator of the invention.

Gyroscopic instrument 10 comprises a fluid tight hermetically sealed cylindrical housing 12, the opposite ends of which are closed by end walls 14 and 15 which have peripheral screw threads enagaging screw threads 16 and 17, respectively formed in the opposite ends of the housing 12. Mounted within housing 12 is a hermetically sealed substantially cylindrical gimbal structure 18 which mounts a gyro motor therein. Gimbal 18 is of smaller external diameter than the interior diameter of housing 12. A cylindrical space 19 is therefore provided between the gimbal 18 and the housing 12 throughout a substantial portion of the longitudinal length of the gimbal. Gimbal 18 is provided with axially aligned protuberances 20 and 22 in axial alignment with the longitudinal axis A—A of the cylindrical housing. Protuberance 22 has a rotor 24 of pick-off synchro 26 nonrotatably secured thereon, which rotor 24 is centrally disposed in operating relation to a synchro stator 27 having opposite terminal ends 28 and 29 respectively.

The outer cylindrical surface of the stator 27 is in snug fitting engagement with the interior cylindrical surface of housing 12. The terminal end 28 of the stator 27 is in abutting engagement with the annular terminal end 30 of a hollow cylindrical bracket 31 which is fixedly secured to the interior surface of housing 12. The opposite terminal end 29 of the stator 27 is engaged by the terminal end of end wall 15 to hold the stator 27 fixedly clamped in place against the bracket 31. Protuberances 20 and 22 are provided with threaded bores 32 and 33, respectively, in axial alignment with the longitudinal axis of the gimbal.

A cylindrical torsion bar 34 having a reduced diameter cylindrical central section 36 and axially opposite threaded end portions 38 and 40 is threadably secured by its end portion 38 in the mating threaded bore 33 in gimbal protuberance 22. The other end portion 40 is threadably secured in a mating threaded bore 42 in cylindrical end wall 15. A cylindrical torsion bar 46 having a reduced diameter cylindrical central section 48 and axially opposite threaded end portions 50 and 52 is threadably secured by its end portion 50 in the mating threaded bore 32 in gimbal protuberance 20. The other end portion 52 is threadably secured in a mating threaded bore 54 in cylindrical support element 55 which is fixedly secured to the interior wall of housing 12.

Support element 55 comprises an inner ring 56 in which threaded bore 54 is formed, an outer ring 57 concentric with the inner ring, and identical circular plates 58 rigidly structurally interconnecting the inner and outer annular rings 56 and 57. The plates 58 have preferably three equally spaced holes 59 therethrough. The gimbal 18 is supported for pivotal movement about the longitudinal axis A—A of the gyroscopic instrument by flexure of the torsion rods 34 and 46 within their elastic limits. It will be appreciated that the torsion rods 34 and 46 are adjusted and maintained in tension by properly adjustably tightening the torsion rods in opposite directions with respect to one another relative to their support elements.

Now that the structural mounting of the gyro gimbal 18 which houses the operating components of the gyroscopic instrument has been described, the new and novel temperature compensating assembly which provides temperature compensation for the gyroscopic instruments in accordance with the invention will now be described.

*Temperature compensating assembly*

The temperature compensating assembly or temperature compensator comprises a bellows assembly 62 operably connected to a shear plate assembly 63. Bellows assembly 62 comprises a first circular support plate 64 having an interior diameter slightly less than the interior diameter of housing 12. Plate 64 has a bottom face 66 and a top face 68, and an outer threaded peripheral flange 70 extending upwardly from its top face which threadably engages the housing threads 16 to hold the plate immovably in place with its central axis in axial alignment with the longitudinal gyro axis A—A. Plate 64 also has an annular flange 72 protruding from top face 68 which is concentric with respect to the flange 70.

A second circular support plate 74 having a bottom face 76 and a top face 78 which has a diameter substantially equal to the interior diameter of plate 64 is disposed in housing 12 with its central axis in axial alignment with the longitudinal gyro axis A—A and with its bottom face 76 in spaced apart relation from the top face 68 of the first plate 64. Support plate 74 has an annular flange 80 protruding from bottom face 76 which has a mean diameter substantially equal to that of annular flange 72.

An annular metallic bellows 81 is hermetically secured at one end to the top face 68 of support plate 64 between flanges 70 and 72. Bellows 81 is hermetically secured at the other end to the bottom face 76 of support plate 74 between the outer peripheral edge of the plate 74 and with its longitudinal axis in axial alignchamber 82. A coil spring 84 is disposed in bellows chamber 82 with its terminal end in engagement with the top face 68 of plate 64 and the bottom face 76 of plate 74 and with its longitudinal axis in axial alignment with the longitudinal gyro axis A—A. The outer surfaces of opposite end portions of the coil spring 84 are in engagement with the interior annular surfaces of annular flanges 72 and 80, respectively. The annular flanges 72 and 80 therefore constrain the coil spring 84 from moving laterally.

Support plate 74 is additionally provided with an annular flange 90 protruding from its top face 78. Flange 90 has a lesser mean diameter than flanges 72 and 80. A third circular support plate 92 having a bottom face 94 and a top face 96 is disposed in housing 12 with its central axis in axial alignment with the longitudinal gyro axis A—A and with its bottom face 94 in spaced apart relation from the top face 78 of the second plate 74. Support plate 92 has an annular flange 98 protruding from bottom face 94 concentrically inwardly from the peripheral edge thereof. Annular flange 98 has a mean diameter substantially equal to that of annular flange 90. A metallic bellows 100 is hermetically secured at one end to the top face of circular support plate 74 between the outer peripheral edge of the plate and the annular flange 90. Bellows 100 is hermetically secured at the other end to the bottom face 94 of circular plate 92 between the outer peripheral edge of the plate and annular flange 98 to form a second bellows chamber 102 which is smaller than the first bellows chamber 82. A coil spring 104 is disposed in bellows chamber 102 with its terminal ends in engagement with the top face of plate 74 and the bottom face of plate 92 with its longitudinal axis in axial alignment with the longitudinal gyro axis A—A. The outer surfaces of opposite end portions of the coil spring 104 are in engagement with the interior annular surfaces of annular flanges 90 and 98, respectively. The flanges 90 and 98 therefore constrain the coil spring 104 from lateral displacement. Coil spring 104 has a different and smaller spring constant than coil spring 84 so that the bellows 100 and bellows 81 have different operational characteristics as shown graphically in FIGURE 2.

Support plate 92 is additionally provided with a post or mechanical stop 106 centrally secured to the bottom face of support plate 92 in axial alignment with the longitudinal gyro axis A—A which extends toward the top face of support plate 74 and an annular flange 108 protrudes from its top face 96. Flange 108 has a lesser mean diameter than flanges 90 and 98.

A third support plate 110 having a bottom face 112 and a top face 114 is disposed in housing 12 with its central axis in axial alignment with the longitudinal gyro axis A—A and with its bottom face 112 in spaced apart relation from the top face 96 of second plate 92. Support plate 110 is cup-shaped in cross section and may be said to comprise a circular top plate 116, a cylindrical sidewall 118, and an annular flange 120 which extends radially outwardly from cylindrical sidewall 118. Support plate 110 has a diameter slightly less than the inside diameter of housing 12. Annular flange 120 has a plurality of preferably three equally spaced through holes 122 therein, only one of which is shown by FIGURE 1.

Support plate 110 has an annular flange 124 protruding from bottom face 112 which has a mean diameter substantially equal to that of annular flange 108. An annular metallic bellows 126 is hermetically secured at one end to the top face 96 of support plate 92 between the outer peripheral edge thereof and the annular flange 108. Bellows 126 is secured at the other end to the bottom face 112 of support plate 110 between the outer peripheral edge of the plate and annular flange 124 to form bellows chamber 128 which is smaller than bellows chamber 102. A coil spring 130 is disposed in bellows chamber 128 with its terminal ends in engagement with the top face of plate 92 and the bottom face of plate 110 and with its longitudinal axis in axial alignment with the longitudinal gyro axis A—A. The outer surfaces of opposite end portions of the coil spring 130 are in engagement with the interior annular surfaces of annular flanges 108 and 124, respectively. The coil spring 130 is therefore constrained from moving laterally by annular flanges 108 and 124. Coil spring 130 has a smaller and different spring constant than coil spring 104 so that the bellows 126 has the operational characteristics, as shown graphically by FIGURE 2. Support plate 110 is additionally provided with a post or mechanical stop 132 which is centrally secured to the bottom face of support plate 110 in axial alignment with the longitudinal gyro axis A—A which extends toward the top face of support plate 92.

Preferably three equally spaced connecting legs 140, only two of which are shown, are secured at end portions 142 to the top surface of the cylindrical sidewall 118 of support plate 110. Each connecting leg 140 extends through a corresponding opening 59 in support plate 55 and is connected at an opposite end portion 144 to a hollow cylindrical shear plate 146 of the shear plate assembly 63 to mount the shear plate for movement with support plate 110. The longitudinal axis of shear plate 146 is in axial alignment with the longitudinal gyro axis A—A. Shear plate 146 has an outer cylindrical guide surface 148 which is of slightly lesser diameter than the interior diameter of housing 12. Shear plate 146 is disposed in housing 12 with its guide surface 148 in guiding relation with the interior cylindrical surface of housing 12. Shear plate 146 has an interior frusto-conical shear face or surface 150. A second hollow cylindrical shear plate 152 is secured to the outer surface of gyro gimbal 18 in longitudinal alignment with the longitudinal gyro axis A—A concentrically with respect to shear plate 146. Shear plate 152 has an outer frusto-conical shear face or surface 154 disposed adjacent the shear face 150 of shear plate 146 to define therewith a variable width shear space 156.

Upon compression and expansion of the bellows assembly 62, shear plate 146 is moved relative to shear plate 152 to vary the width of shear space 156. It will be understood, however, that it is within the scope of this invention to adapt shear plate 152 to be moved relative to shear plate 146. Now that the structural details of an embodiment of the invention has been described, the operation of the invention will be described.

*Operation*

The gyroscopic instrument 10 is assembled by first securing support plate 55 in housing 12. The gyro gimbal with one end of each of torsion rods 46 and 34 screwed into the threaded bores 32 and 33 thereof is inserted into the housing and the gimbal is rotated to engage the threaded free end of torsion rod 46 in the threaded bore of support 55.

The circular end wall 15 is then threaded into the threaded end of housing 12 such that the threaded end 40 of torsion bar 34 is concomitantly threaded into the bore 42 in the end wall 15. By this means, torsion bars 34 and 46 are placed in tension to support the gimbal 18 between end wall 15 and support 55. The terminal end of end wall 15 in its implaced position engages synchro stator 27 to hold the stator firmly in place against the bracket 31.

The bellows assembly 62 and shear plate assembly 63 are next inserted into the cylindrical housing 12 through the opposite open threaded end of the housing. These assemblies are retained in place by the threadable engagements of the peripheral threads 70 of the bottom plate 64 of the bellows assembly and the threads 16 in the end of the housing 12. The housing 12 is in turn closed by screw threadably engaging the cylindrical end wall 14 with the threads 16 at the end of the housing 12 to complete the structural assembly of the gyroscopic instrument.

The bellows chambers 82, 102, and 128 of bellows assembly 62 are preferably evacuated prior to the assembly of the bellows assembly. After assembly of the gyroscopic instrument, the housing 12 is filled with a suitable damping liquid 160, such as for example Dow-Corning series #200 silicone damping liquid.

Shock and vibration forces may be transmitted from housing 12 to the gimbal 18 through torsion bars 34 and 46. Large sustained shock and vibration forces, it will be appreciated, have a tendency to overly stress the torsion rods and adversely affect the operation of the precision gyroscopic instrument. A liquid surrounding such a suspended gimbal has the inherent attribute of damping forces which may be transmitted from the gyro case to the gimbal. It is for the purpose of utilizing this damping effect of a liquid that gimbal 18 is immersed in the damping liquid 160. The coefficient of damping or damping force that the liquid exerts upon the gimbal 18 when the gimbal moves is determined by the configuration of all of the exposed gimbal areas with which the damping liquid interacts and the viscosity of the damping liquid.

If the viscosity of the preferred damping liquid remained constant under all temperature conditions, the damping force of the damping liquid would remain constant under all temperature conditions. However, the viscosity of the damping liquid varies exponentially with a variation in temperature. The variation of the viscosity of the damping liquid with a variation in the temperature is plotted graphically as the solid line 165 in FIGURE 2. It is desirable and necessary to maintain the damping force of the liquid substantially constant over the viscosity range of the damping liquid.

To maintain the damping force of the damping liquid constant over its viscosity range, the gimbal 18 is made of lesser diameter than the interior diameter of housing 12 to provide a cylindrical liquid filled space 19. The shear plate 152 is secured to gimbal 18 while shear plate 146 is adjustably mounted relative thereto to vary the width of the shear space 156 with changes in the effective temperature.

By this construction the damping liquid 160 is permitted to dampen arcuate movement of the gimbal 18 relative to its torsion bar support elements 34 and 46 by the interaction of the damping liquid within the shear space 156 provided between the frusto-conical shear faces 150 and 154 of shear plates 146 and 152, respectively. Some damping action may be effected by the damping liquid in cylindrical space 19. However, the space 19 is so large in relation to the relatively small width of the shear space 156 that the damping action of the damping liquid in space 19 is negligible with respect to the damping action of the damping liquid in space 156. It may be seen then that the effective damping area of the gimbal 18 is defined by the shear faces of shear plates 146 and 152, and that the major damping which is effected by the damping liquid 160 is effected in the shear space 156 defined by shear faces 150 and 154.

The damping effect of the damping liquid 160, such as for example Dow-Corning series #200 silicone damping liquid, varies as a function of the gimbal area with which it interacts and the viscosity of the damping liquid. The viscosity of the damping liquid varies exponentially as a function of temperature variations. Therefore, it is only necessary to vary the displacement of shear plate 146 with respect to shear plate 152 exponentially as a function of temperature variations to maintain the damping force of the damping liquid constant over its viscosity range.

Thus, if the width of the shear space 156 is varied in proportion to the damping liquid viscosity variation, the damping coefficient of the damping liquid remains constant because the ratio of liquid viscosity to shear space width is proportional to the damping coefficient of the damping liquid 160.

Moreover, the volume of the damping liquid 160 varies linearly as a function of variations in the ambient temperature. This characteristic of the damping liquid is utilized to longitudinally position the frusto-conical shear face of shear plate 146 relative to the cooperating frusto-conical shear face of shear plate 152 which is connected to the gimbal 18 as an exponential function of variations in the ambient temperature.

In effectuating the foregoing, the bellows assembly 62 is connected by connecting members 140 to shear plate 146. The bellows chambers of the bellows assembly are, as before mentioned, evacuated. Let us assume, for purposes of illustration, that the temperature of the ambient air surrounding the gyroscopic instrument is initially at the low end of the operating range of the damping compensator, for example, minus 55° centigrade. At this temperature the damping fluid 160 is contracted to a minimum volume and consequently has a high viscosity. The bellows assembly 62 is therefore expanded to maximum length under the biasing force of the independent coil springs 84, 104, and 130 having increasingly smaller spring constants, respectively. The coil springs are slightly compressed at this temperature and the shear space 156 for a damping liquid 160 such as the Dow-Corning series #200 damping liquid may be at a maximum width which is so selected as to provide the required coefficient of damping for the high viscosity of the damping liquid encountered at this temperature.

If the ambient temperature increases an incremental amount, there will result a proportional volumetric increase in the damping liquid and a proportional decrease in the viscosity of the damping liquid. The damping liquid is relatively incompressible; therefore, the linear volumeric increase of the damping liquid will compress the bellows assembly 62 to decrease the volumetric space of the housing occupied by the bellows assembly. If no coil springs were provided within the bellows assembly, the bellows assembly would be linearly longitudinally compressed in response to a volumetric increase of the damping liquid, thus moving shear plate 146 relative to shear plate 152 as a linear function of the temperature change. It is necessary, however, to longitudinally compress the bellows as an exponential function of the temperature variation in accordance with the viscosity variation of the damping liquid. The coil springs 84, 104, and 130 are provided with spring values so selected as to effectuate the required exponential function. Therefore, upon an initial volumetric damping liquid increase the coil spring 130 therein will be first compressed at a relatively high rate, as shown graphically in FIGURE 2, until mechanical stop 132 abuts support plate 92, because coil spring 130 has a smaller spring constant than coil springs 84 and 104. The high rate steep slope compression curve 164 of bellows 126 is graphically depicted in dotted line in FIGURE 2. It will be seen that during the low temperature range, the width of the shear space 156 is decreased at a relatively fast rate in proportion to the decrease in viscosity of the damping fluid in response to the compression of bellows 126 and spring 130 in substantial conformance with the corresponding portion of the exponential viscosity curve 165 of the damping liquid.

Upon a further temperature increase over a medium temperature range after the mechanical stop 132 has stopped the further compression of bellows 126 and compression spring 130 the volume of the damping liquid will continue to increase linearly and its viscosity will continue to decrease exponentially. In response to this further volumetric increase of the damping liquid medium size bellows 100 and medium size coil spring 104 will be longitudinally compressed until mechanical stop 106 abuts support plate 74. The bellows 100 is smaller than bellows 81 and coil spring 104 has a different and smaller spring constant than coil spring 84. Therefore, bellows 100 and coil spring 104 alone compress in accordance with the medium rate and medium slope compression curve 166, FIGURE 2, during the medium temperature range to decrease the width of shear space 156 at a medium rate in substantial conformance with the exponential viscosity curve 165.

Upon a further temperature increase over a high temperature range, up to the upper operating limit range of 85 degrees centigrade, for example, after mechanical stop 106 has stopped further compression of bellows 100 and coil spring 104, the volume of the damping liquid will continue to increase linearly and its viscosity will continue to decrease exponentially. In response to this further volumetric increase, the bellows 81 and coil spring 84 will be longitudinally compressed in accordance with the low slope low rate compression curve 168, FIGURE 2, during the high temperature range to decrease the width of shear space 156 at a slow rate in substantial conformance with the exponential viscosity curve 165 to a minimum width to match the operating characteristics of the damping liquid 160, as indicated for example by curve 165 of FIGURE 2.

It will be seen from the foregoing that each bellows of the bellows assembly 62 is designed to provide linear temperature compensation for variations over a predetermined limited range of the temperature viscosity curve of the total temperature range. The three stage bellows assembly compression-expansion characteristic, it will be seen from an inspection of FIGURE 2, approximates the temperature-viscosity curve of the damping liquid. Closer conformance to the temperature-viscosity curve 165 could be obtained by increasing the number of bellows which comprise the bellows assembly.

The operating ranges of the bellows are determined by the spring rate-to-diameter ratio of each bellows and the mechanical stops. Therefore, by modifying the spring rate-to-diameter ratio of each bellows section and/or the compression or expansion limits of the bellows, the bellows assembly 62 may be designed to actuate the shear plate assembly 63 in accordance with the temperature-viscosity curve of the particular damping liquid utilized.

While there have heretofore been provided sealed gyroscopes in which a controlled density gimbal may be floated in a high density liquid to relieve the weight of the gimbal from the gimbal pivots and in which there may be arranged in cooperation with such liquid a bellows to provide compensation for changes in the volume of the damping liquid due to variations in the ambient temperature, the present invention provides novel means to compensate simultaneously for both changes in the volume and viscosity of the damping liquid due to such changes in the temperature.

In the present invention it is the linear volume change in the damping liquid due to change in the effective temperature which actuates the novel bellows arrangement 62 so as to provide a non-linear adjustment to the damping compensator 63. Moreover, while in the prior sealed gyroscope instruments, the controlled gyroscope may be floated in the high density liquid to relieve the weight of the gimbal from the gimbal pivots, in the present invention the damping liquid used may be of an average density (0.97 specific gravity) stable viscosity liquid in which the gimbal may not float and in which the liquid serves to dampen arcuate motion of the gimbal about the longitudinal or operative axis A—A of the torsion rods 34 and 46.

Furthermore, although a very stable damping liquid may be utilized, the extended temperature range for which the instrument is designed for operation (—55° C. to +85° C.) would cause over such a range variations in volume and viscosity of the damping liquid which would make tight control of the damping very difficult without temperature compensation.

The present invention therefore serves to compensate simultaneously for the change in volume and viscosity of the damping liquid 160 through the operation of the novel multiple bellows assembly 62 which will expand as the damping liquid contracts with decreasing temperature so that the shear gap 156 will be constantly filled with the damping liquid while viscosity compensation is effected by the bellows assembly 62 varying the width of the shear gap 156 in proportion to the liquid viscosity variation so that the ratio of the liquid viscosity to the width of the shear gap 156, which is proportional to the coefficient of damping, remains constant.

A feature of the invention is the manner in which it utilizes the linear-volume temperature characteristics of the damping liquid to actuate the shear plate assembly 63 so as to compensate for the non-linear variation of the viscosity of the liquid with temperature.

Figure 2:
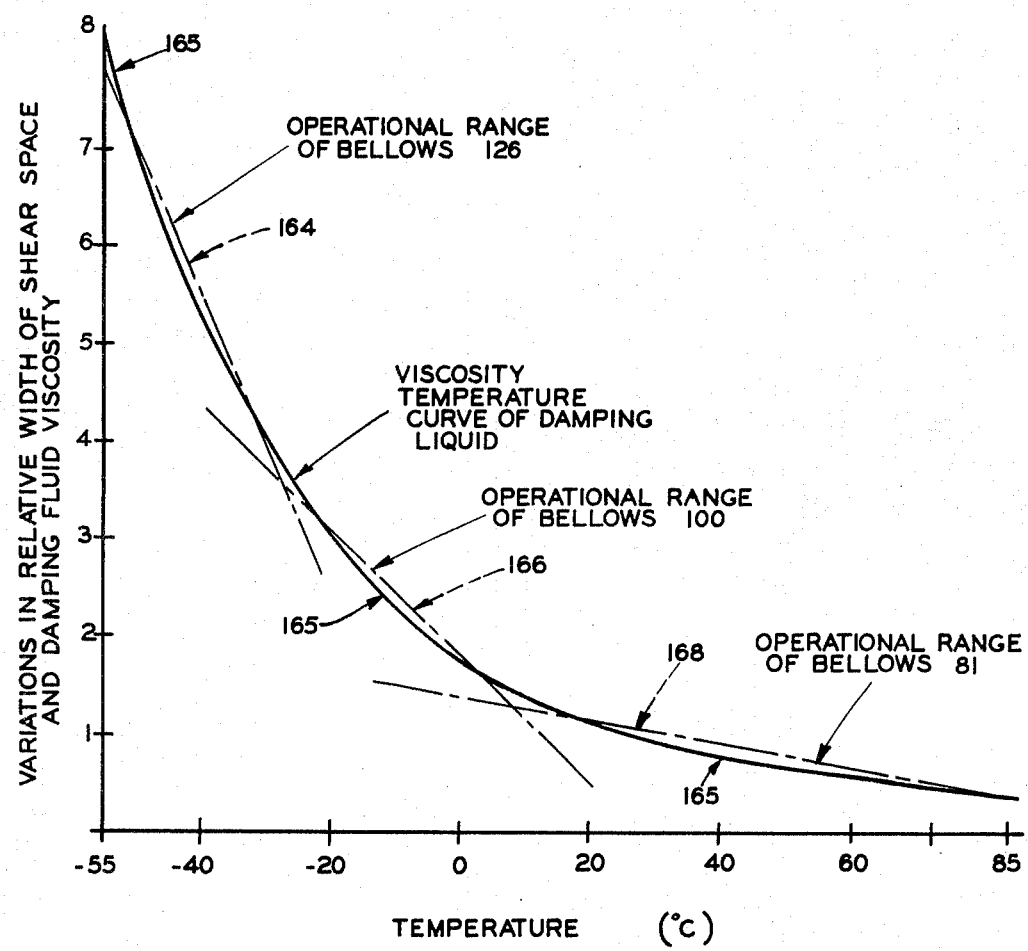
FIGURE 2 is a graph comparing the variations in the relative width of the shear space and viscosity of the damping liquid with changes in the effective temperature.

In the bellows arrangement 62, each bellows is designed to provide linear temperature compensation for variation in liquid viscosity over a certain limited area of the temperature range. The slope and position of each compensating section may be adjusted to provide an accurate fit to the non-linear curve of the liquid viscosity. The parallel between this mechanical temperature compensation with the temperature-viscosity curve 165 of the damping liquid, such as for example, Dow-Corning #200 damping liquid, is shown in FIGURE 2. A closer conformance may, of course, be obtained by adding one or more sections to the bellows assembly 62. Also by modifying the spring-rate-to-diameter ratio of each section and the compression or expansion limiting stops of each section, various curve shapes of decreasing width of shear space 156 with increasing temperature may be obtained.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A gyroscopic instrument comprising a housing, an enclosed gimbal, support means mounting said gimbal within said housing for arcuate movement about a longitudinal axis, a damping liquid filling said housing, the volume and viscosity of said damping liquid varying with ambient temperature, a resilient bellows assembly mounted within said housing, a shear plate assembly mounted within said housing and having a pair of relatively movable shear plate elements, one of said elements being supported on said gimbal and the other of said elements being supported by said bellows assembly in spaced relation to the first mentioned shear plate element so as to define therebetween a shear space, said damping liquid being applied in said shear space in cooperative relation between said shear plate elements to dampen arcuate movement of said gimbal about said longitudinal axis, said bellows assembly including a plurality of bellows of different size, each having a resilient biasing means therein for continuously urging said bellows toward an expanded condition to adjustably position the other shear plate element relative to the one shear plate element to vary the shear space and thereby the damping liquid applied between said shear plate elements upon a change in the ambient temperature so as to maintain the damping coefficient of said damping liquid applied between said shear plate elements substantially constant over a wide temperature range.

2. A gyroscopic instrument comprising a housing, an enclosed gimbal, torsion bars supporting said gimbal at opposite ends from said housing for arcuate movement about a longitudinal axis, a damping liquid filling said housing, said liquid varying in volume as a direct function of a temperature variation and the viscosity of said liquid varying inversely as a function of said temperature variation, a bellows assembly comprising a plurality of expansible and contractible bellows sections of varying sizes, each of said bellows sections including spring means for urging said bellows sections to an expanded condition and in a direction toward said gimbal, a shear plate assembly having spaced apart relatively movable portions forming therebetween a shear space, said spaced apart relatively movable shear plate portions having frusto-conical surfaces facing each other and forming a variable width shear space therebetween, said damping liquid being applied in said shear space between said movable portions and in cooperative relation therewith to dampen the arcuate movement of said gimbal about said longitudinal axis, one of said portions being mounted on said gimbal and the other of said portions being mounted on said bellows assembly for reciprocating movement therewith to vary the shear space and thereby the damping relation of the damping liquid between said portions of the shear plate assembly, and said bellows assembly being expansible and contractible in response to variations in the volume of said liquid upon temperature variations in such a manner as to vary the width of said shear space to compensate for a variation in the viscosity of said damping liquid.

3. For use in a gyroscopic instrument having a housing, a gimbal mounted within said housing and movable relative to said housing about a longitudinal axis, a damping liquid, said liquid having a volume and viscosity varying with changes in the temperature thereof, said damping liquid filling the housing to dampen forces which may be transmitted between the housing and the gimbal, a temperature compensating assembly comprising a bellows assembly supported by said housing and a shear plate assembly including first and second elements forming a shear space therebetween, one of said elements being supported by said gimbal, and the other of said elements being supported by said bellows assembly in guided relation with said housing, said damping liquid being applied in said shear space in cooperative relation between said first and second elements to dampen the movement of said gimbal relative to said housing about said longitudinal axis, said bellows assembly having spring biased bellows sections each expansible and contractible at a different rate in response to variations in the volume of the damping fluid in response to changes in ambient temperature, said bellows sections being operatively connected so as to adjust the other of said elements and the width of said shear space to compensate for variations in the viscosity of the damping liquid due to said changes in the temperature and thereby maintain the damping effect of said liquid substantially constant over a wide range of change in the ambient temperature.

References Cited by the Examiner

UNITED STATES PATENTS

| | | | |
|---|---|---|---|
| 2,383,461 | 8/1945 | Esval et al. | 74—5.4 X |
| 2,585,024 | 2/1952 | Lundberg | 74—5.5 X |
| 2,618,159 | 11/1952 | Johnson et al. | 74—5 |
| 2,650,502 | 9/1953 | Lundberg et al. | 74—5 |
| 2,839,931 | 6/1958 | Pope | 74—5 |
| 2,902,863 | 9/1959 | Steele | 74—5.5 |
| 2,984,114 | 5/1961 | Bostwick et al. | 74—5.5 |

MILTON KAUFMAN, *Primary Examiner.*

BROUGHTON G. DURHAM, *Examiner.*